United States Patent
Fujita et al.

(10) Patent No.: US 9,298,177 B2
(45) Date of Patent: Mar. 29, 2016

(54) MACHINE TOOL AND CONTROL METHOD THEREFOR

(71) Applicant: Toshiba Kikai Kabushiki Kaisha, Chiyoda-ku, Tokyo-to (JP)

(72) Inventors: Jun Fujita, Numazu (JP); Chihiro Saga, Numazu (JP)

(73) Assignee: Toshiba Kikai Kabushiki Kaisha, Chiyoda-ku, Tokyo (JP)

( * ) Notice: Subject to any disclaimer, the term of this patent is extended or adjusted under 35 U.S.C. 154(b) by 0 days.

(21) Appl. No.: 14/290,501

(22) Filed: May 29, 2014

(65) Prior Publication Data

US 2014/0354209 A1 Dec. 4, 2014

(30) Foreign Application Priority Data

Jun. 3, 2013 (JP) ................. 2013-116982

(51) Int. Cl.
| | |
|---|---|
| *G05D 3/10* | (2006.01) |
| *G05B 19/00* | (2006.01) |
| *G05B 19/404* | (2006.01) |
| *B23Q 5/40* | (2006.01) |
| *B23Q 5/56* | (2006.01) |
| *G05B 23/02* | (2006.01) |

(52) U.S. Cl.
CPC ........ *G05B 19/00* (2013.01); *B23Q 5/40* (2013.01); *B23Q 5/56* (2013.01); *G05B 19/404* (2013.01); *G05B 23/0283* (2013.01); *G05B 2219/41032* (2013.01)

(58) Field of Classification Search
CPC ...................................... G05D 3/10
USPC ......................... 318/639, 638, 560
See application file for complete search history.

(56) References Cited

U.S. PATENT DOCUMENTS

| | | | | |
|---|---|---|---|---|
| 4,101,817 A | * | 7/1978 | Maeda et al. ................. | 318/603 |
| 5,210,476 A | * | 5/1993 | Kazato ........................... | 318/560 |
| 6,316,903 B1 | * | 11/2001 | Shamoto ............. | G05B 19/416 318/625 |
| 6,408,230 B2 | * | 6/2002 | Wada ............................... | 701/1 |

FOREIGN PATENT DOCUMENTS

| | | |
|---|---|---|
| JP | 2002-297241 | 10/2002 |
| JP | 2012-168926 | 9/2012 |

OTHER PUBLICATIONS

English Language Abstract and Translation for JP 2002-297241 published Oct. 11, 2002.
English Language Abstract and Translation for JP 2012-168926 published Sep. 6, 2012.

* cited by examiner

*Primary Examiner* — David S Luo
(74) *Attorney, Agent, or Firm* — DLA Piper LLP (US)

(57) ABSTRACT

A machine tool according to an embodiment includes a drive mechanism configured to move a control target; a motor configured to operate the drive mechanism; a first encoder configured to detect a position of the control target; a second encoder configured to detect a position of the motor; a servo control unit configured to control the motor; and a numerical control unit configured to receive or calculate an error between the position of the control target obtained from a detection result of the first encoder and a position of the control target obtained from a detection result of the second encoder from the servo control unit, and to estimate a transmission error of the drive mechanism based on a change amount of the error between before and after inversion of a moving direction of the control target.

12 Claims, 4 Drawing Sheets

MACHINE TOOL AND CONTROL METHOD THEREFOR

CROSS-REFERENCE TO RELATED APPLICATION

This application is based upon and claims the benefit of priority from the prior Japanese Patent Application No. 2013-116982, filed on Jun. 3, 2013, the entire contents of which are incorporated herein by reference.

BACKGROUND OF THE INVENTION

1. Field of the Invention

Embodiments of the present invention relate to a machine tool and a control method therefor.

2. Related Art

Generally, a machine tool controls a control target such as a table on which a workpiece is mounted or a spindle head on which a tool that cuts the workpiece is mounted by using a numerical control device or a servo unit. The numerical control device outputs a position command to the servo unit. The servo unit controls the position of the control target in response to the position command via a transmission mechanism constituted by, for example, a rack and a pinion or a ball screw and a nut.

In a state where a backlash, a friction or the like is present in such a transmission mechanism, a motor is often unable to accurately control a position of the control target even if the numerical control device and the servo unit accurately control a rotational position of the motor. For example, when a backlash is present in the transmission mechanism and the servo unit is to invert the moving direction of the control target via the motor, the control target stops by as much as the backlash despite rotation (inversion) of the motor. That is, it often occurs that the control target does not instantly follow the position command. This tracking error is referred to as "lost motion".

When a lost motion amount increases, then vibration following an axial movement becomes stronger, and a vibration pattern is transferred onto a machining surface of a machining target. This causes degradation in the quality of the machining target. Normally, a user requests a manufacturer or repair shop to repair or adjust the machine tool after noticing degradation in the machining surface. The manufacturer or repair shop sets the numerical control device and the servo unit in semi-closed loop controlled states, checks the lost motion amount using a DBB (Double Ball Bar) measuring instrument, obtains components necessary for the repair, and then repairs the machine tool. In this case, the user is unable to use the machine tool for a long period of time until the manufacturer or repair shop can obtain the components necessary for the repair.

The present invention has been achieved to solve the above problems, and an object of the invention is to provide a machine tool that is unnecessary to stop for a long period of time even if a lost motion amount is abnormally large and that can estimate an accurate lost motion amount as compared with conventional techniques, and a control method therefor.

SUMMARY OF THE INVENTION

A machine tool according to an embodiment includes: a drive mechanism configured to move a control target; a motor configured to operate the drive mechanism; a first encoder configured to detect a position of the control target; a second encoder configured to detect a position of the motor; a servo control unit configured to control the motor; and a numerical control unit configured to receive or calculate an error between the position of the control target obtained from a detection result of the first encoder and a position of the control target obtained from a detection result of the second encoder from the servo control unit, and to estimate a transmission error of the drive mechanism based on a change amount of the error between before and after inversion of a moving direction of the control target.

The numerical control unit may be configured to receive or calculate a first error of the drive mechanism from the servo control unit, the first error being based on the position of the control target obtained from the detection result of the first encoder and the position of the control target obtained from the detection result of the second encoder before the inversion of the moving direction of the control target, receive or calculate a second error of the drive mechanism from the servo control unit, the second error being based on the position of the control target obtained from the detection result of the first encoder and the position of the control target obtained from the detection result of the second encoder after the inversion of the moving direction of the control target, and estimate a difference between the first error and the second error as the transmission error of the drive mechanism.

The numerical control unit may be configured to receive or calculate a first error of the drive mechanism from the servo control unit, the first error being based on the position of the control target obtained from the detection result of the first encoder and the position of the control target obtained from the detection result of the second encoder before the inversion of the moving direction of the control target, receive or calculate a second error of the drive mechanism from the servo control unit, the second error being based on the position of the control target obtained from the detection result of the first encoder and the position of the control target obtained from the detection result of the second encoder after the inversion of the moving direction of the control target, and calculate a difference between the first error and the second error a plurality of times to obtain a plurality of differences, and estimate an average value of the differences as the transmission error of the drive mechanism.

The machine tool may further include a storage unit configured to store therein a flag, the flag rising when a position command output from the numerical control unit to the servo control unit indicates the inversion of the moving direction of the control target.

The numerical control unit may set the first error when the flag falls and sets the second error after the flag rises in order to calculate a difference between the first error and the second error.

The flag may fall when the moving direction of the control target is actually inverted after the position command indicates the inversion of the moving direction of the control target.

The machine tool may further include a display unit configured to display an estimated value of the transmission error of the drive mechanism.

The machine tool may further include an alarm unit configured to issue an alarm when an estimated value of the transmission error of the drive mechanism exceeds a predetermined value.

The storage unit stores therein a plurality of estimated values of the transmission error of the drive mechanism, and the display unit or the alarm unit notifies a user of a maintenance timing of the drive mechanism based on the estimated values.

A control method for a machine tool according to an embodiment includes: a drive mechanism configured to move a control target; a motor configured to operate the drive mechanism; a first encoder configured to detect a position of the control target; a second encoder configured to detect a position of the motor; a servo control unit configured to control the motor; and a numerical control unit configured to output a position command to the servo control unit, the method comprising:

receiving or calculating an error between the position of the control target obtained from a detection result of the first encoder and a position of the control target obtained from a detection result of the second encoder;

calculating a change amount of the error between before and after inversion of a moving direction of the control target; and estimating a transmission error of the drive mechanism based on the change amount of the error.

The receiving or calculating the error may include:

receiving or calculating a first error of the drive mechanism based on the position of the control target obtained from the detection result of the first encoder and the position of the control target obtained from the detection result of the second encoder before the inversion of the moving direction of the control target; and receiving or calculating a second error of the drive mechanism based on the position of the control target obtained from the detection result of the first encoder and the position of the control target obtained from the detection result of the second encoder after the inversion of the moving direction of the control target, and a difference between the first error and the second error is estimated as the transmission error of the drive mechanism.

The receiving or calculating the error may include:

receiving or calculating a first error of the drive mechanism based on the position of the control target obtained from the detection result of the first encoder and the position of the control target obtained from the detection result of the second encoder before the inversion of the moving direction of the control target, receiving or calculating a second error of the drive mechanism based on the position of the control target obtained from the detection result of the first encoder and the position of the control target obtained from the detection result of the second encoder after the inversion of the moving direction of the control target, and repeatedly receiving or calculating the error, calculating a difference between the first error and the second error a plurality of times to obtain a plurality of differences, and estimating an average value of the differences as the transmission error of the drive mechanism.

The first error may be set when a flag falls and the second error is set after the flag rises in order to calculate the difference between the first error and the second error, the flag rising when a position command output from the numerical control unit to the servo control unit indicates the inversion of the moving direction of the control target.

The flag may fall when the moving direction of the control target is actually inverted after the position command indicates the inversion of the moving direction of the control target.

The machine tool may be configured to issue an alarm when an estimated value of the transmission error of the drive mechanism exceeds a predetermined value.

The machine tool may notify a user of a maintenance timing of the drive mechanism based on the estimated values.

DETAILED DESCRIPTION OF THE INVENTION

Embodiments will now be explained with reference to the accompanying drawings. The present invention is not limited to the embodiments.

Figure 1:
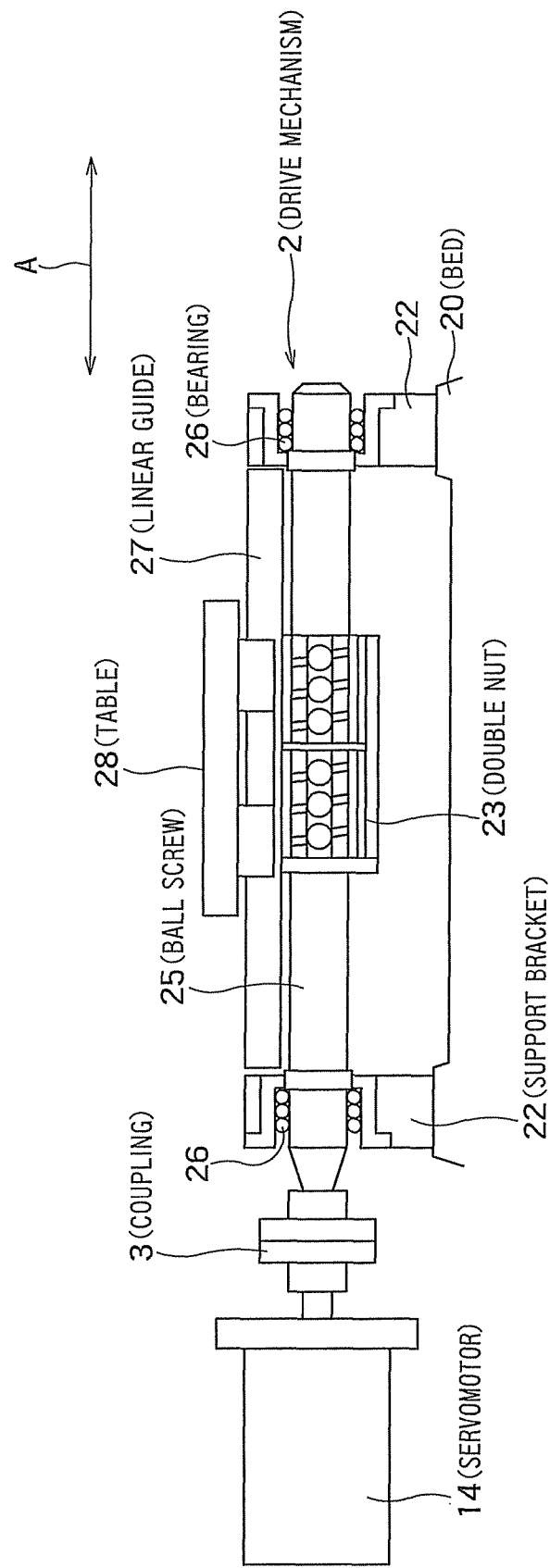
FIG. 1 shows an example of a configuration of a servomotor 14 and a drive mechanism 2 of a machine tool according to an embodiment.

FIG. 1 shows an example of a configuration of a servomotor 14 and a drive mechanism 2 of a machine tool according to an embodiment. The servomotor 14 (hereinafter, also "motor 14") is coupled to the drive mechanism 2 via a coupling 3. The drive mechanism 2 includes a bed 20, a support bracket 22, nuts 23, a ball screw 25, bearings 26, a linear guide 27, and a table 28.

The bed 20 is fixed to a main body of the machine tool and other constituent elements of the drive mechanism 2 are mounted on the bed 20. The support bracket 22 is fixedly arranged on the bed 20 and configured to support both ends of the ball screw 25 via the bearings 26. The ball screw 25 is coupled to the servomotor 14 by the coupling 3 and configured to rotate to follow rotation of a shaft of the servomotor 14. A screw hole is formed in each nut 23 so as to be threaded with a threaded portion of the ball screw 25, and the nut 23 can move in an axial direction of the ball screw 25 to follow rotation of the ball screw 25. The table 28 serving as a control target is fixed to the nuts 23 and supported by the linear guide 27. The table 28 moves in axial directions (two directions indicated by an arrow A) of the ball screw 25 and the linear guide 27 to follow the movement of the nuts 23. A workpiece (not shown) is mounted on the table 28, and the table 28 operates the workpiece relatively to the bed 20 so as to cut the workpiece by a tool (not shown). A spindle head or the like can serve as the control target.

In this way, the machine tool can transform a rotational motion of the servomotor 14 into a linear motion of the table 28.

Figure 2:
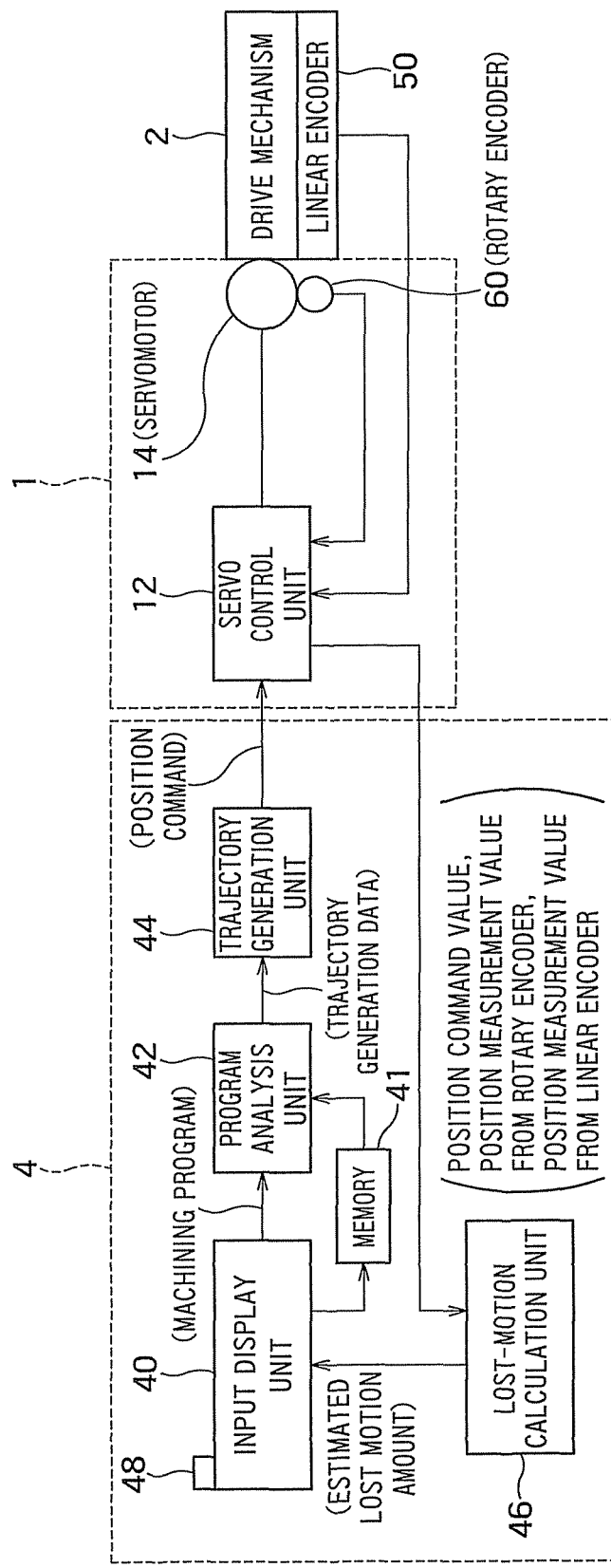
FIG. 2 is a block diagram showing an example of configurations of a servo unit 1, the drive mechanism 2, and a numerical control device 4 according to the present embodiment.

FIG. 2 is a block diagram showing an example of configurations of a servo unit 1, the drive mechanism 2, and a numerical control device 4 according to the present embodiment. The numerical control device 4 includes an input display unit 40, a memory 41, a program analysis unit 42, a trajectory generation unit 44, a lost-motion calculation unit 46, and an alarm unit 48.

The input display unit 40 is an interface between an operator and the numerical control device 4 and is a touch panel display, for example. The operator inputs or selects a machining program on the input display unit 40.

For example, the memory 41 is a ROM (Read Only Memory), a RAM (Random Access Memory), an HDD (Hard Disc Drive) and/or an SSD (Solid State Drive). The memory 41 stores therein a system program for controlling the entire machine tool, the machining program, machine tool parameters, and various data. A RAM area of the memory 41 is used as a load area or a work area at the time when a CPU 10 (not shown) executes the system program or the like.

The program analysis unit 42 analyzes the machining program obtained from the memory 41 and creates trajectory generation data. By analyzing the machining program, the program analysis unit 42 obtains coordinates of a target position to which a drive unit of the machine tool is moved, and a target moving velocity and the like of the drive unit for each block of the machining program. A block is a basic unit of the machining program and indicates, for example, a command for one row. For example, one block indicates a command of a basic operation such as a linear movement, a circular movement or start/stop of rotation of a spindle (not shown). The program analysis unit 42 thereby creates the trajectory generation data for each block. The program analysis unit 42 transfers the trajectory generation data to the trajectory generation unit 44, and the trajectory generation unit 44 generates a position command for each sampling period.

The servo control unit 12 of the servo unit 1 controls the motor 14 in response to the position command from the numerical control device 4. A rotary encoder 60 is provided at the motor 14. The rotary encoder 60 detects the rotation of the shaft of the motor 14 and measures a position change of the shaft of the motor 14. The rotary encoder 60 feeds back the position change of the shaft of the motor 14 to the servo control unit 12.

The motor 14 operates the drive mechanism 2 as described with reference to FIG. 1. The table 28 thereby moves along the linear guide 27. A linear encoder 50 connected to the table 28 is provided at the drive mechanism 2. The linear encoder 50 measures a position change of the table 28. The linear encoder 50 feeds back the position change of the table 28 to the servo control unit 12.

The servo control unit 12 receives feedback from the linear encoder 50 and the rotary encoder 60, and corrects a position measurement value for correcting the position of the table 28 or that of the motor 14. The servo control unit 12 generates a velocity command using a difference between the corrected position measurement value and a position command value.

Furthermore, the servo control unit 12 transfers a position measurement value of the table 28 fed back from the linear encoder 50 or that of the motor 14 fed back from the rotary encoder 60 to the lost-motion calculation unit 46.

The lost-motion calculation unit 46 calculates an error between the position measurement value of the table 28 obtained from a detection result of the linear encoder 50 (hereinafter, also "position measurement value from the linear encoder 50") and a position measurement value of the table 28 obtained from a detection result of the rotary encoder 60 (hereinafter, also "position measurement value from the rotary encoder 60"). Because the rotary encoder 60 detects the position of the shaft (an angular position) of the motor 14, the rotary encoder 60 itself, the servo control unit 12 or the lost-motion calculation unit 46 calculates the position (a converted position) of the table 28 from the angular position of the motor 14. Alternatively, the servo control unit 12 can calculate the error between the position measurement value from the linear encoder 50 and that from the rotary encoder 60.

In this case, the lost-motion calculation unit 46 receives, from the servo control unit 12, the error between the position measurement value from the linear encoder 50 and that from the rotary encoder 60. Moreover, the lost-motion calculation unit 46 calculates a change amount of the error between before and after inversion of a moving direction of the table 28, and estimates a transmission error (a lost motion amount) of the drive mechanism 2 based on the change amount. The alarm unit 48 issues an alarm when an estimated value of the lost motion amount exceeds a predetermined value.

The memory 41, the program analysis unit 42, the trajectory generation unit 44, and the lost-motion calculation unit 46 can be realized by either one CPU (Central Processing Unit) or individual memories or CPUs.

A mechanical error such as a backlash or a nonlinear error such as a friction or an elastic deformation is present between the ball screw 25 and the nuts 23. Such an error causes a mechanical transmission error between the motor 14 and the table 28. For example, the motor 14 shown in FIG. 1 rotates the ball screw 25 in one direction to move the table 28 in one of the two directions indicated by the arrow A, and the motor 14 then inverts a rotational direction of the ball screw 25 to move the table 28 in the other direction (the opposite direction) indicated by the arrow A. At this time, when the backlash or the like is present between the ball screw 25 and the nuts 23, there is a period of a state where the table 28 does not move but remains stopping despite the inversion of the motor 14. Such a state where the table 28 does not move despite the inversion of the motor 14 is referred to as "lost motion".

Figure 3:
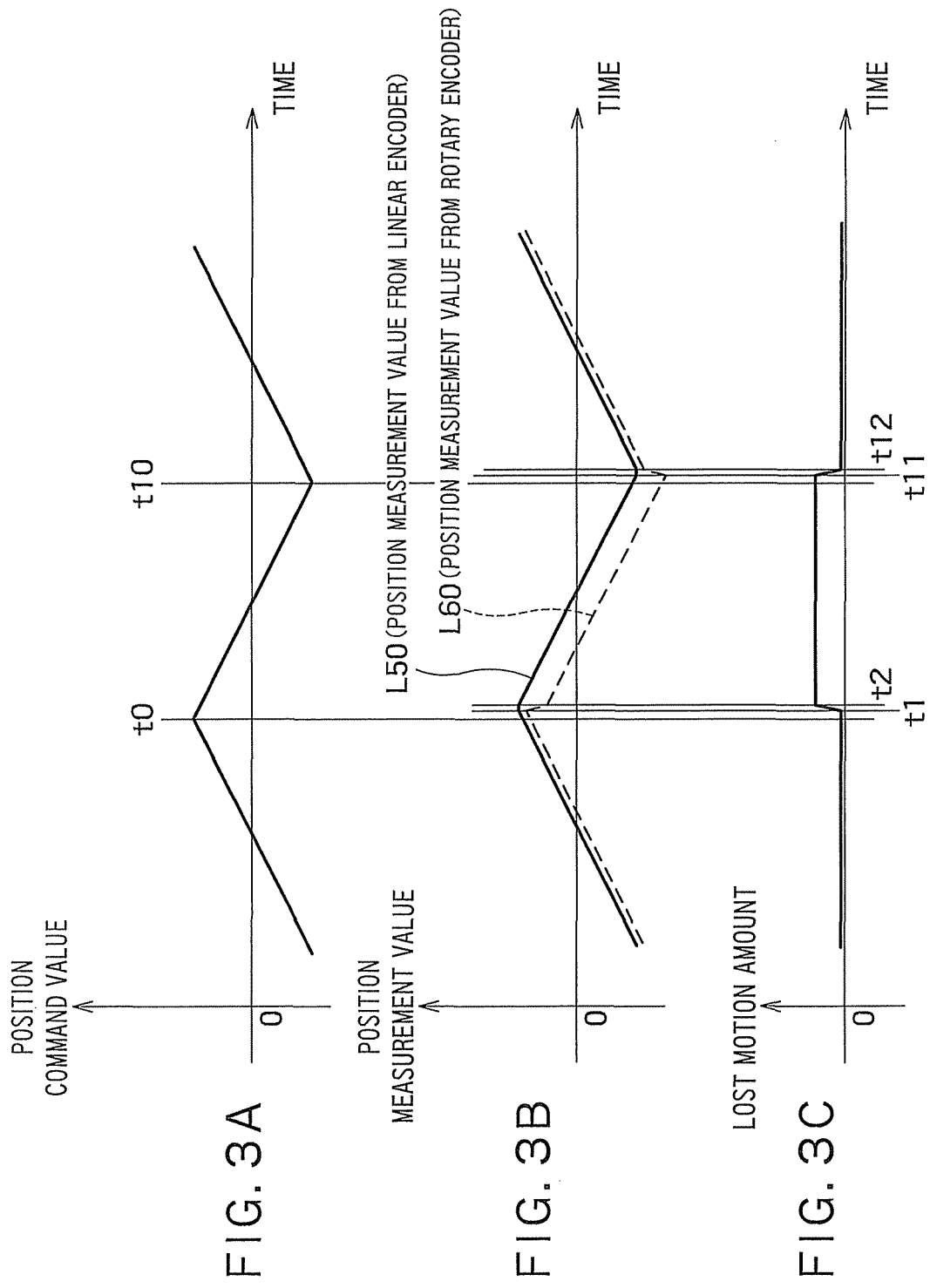
FIG. 3A is a graph showing an example of the position command value according to the present embodiment.
FIG. 3B is a graph showing an example of the position measurement values of the table 28 fed back from the linear encoder 50 and the rotary encoder 60, respectively.
FIG. 3C is a graph showing the lost motion amount.

FIG. 3A is a graph showing an example of the position command value according to the present embodiment, FIG. 3B is a graph showing an example of the position measurement values of the table 28 fed back from the linear encoder 50 and the rotary encoder 60, respectively, and FIG. 3C is a graph showing the lost motion amount (length). In FIGS. 3A to 3C, the horizontal axis indicates time.

As shown in FIG. 3A, the numerical control device 4 outputs the position command value to the servo control unit 12. For example, the numerical control device 4 outputs the position command value to move the table 28 to a first direction until a time t0. The numerical control device 4 changes the position command value to invert the moving direction of the table 28 to a second direction at the time t0. Thereafter, the numerical control device 4 outputs the position command value to move the table 28 to the second direction until a time t10. The numerical control device 4 changes the position command value to invert again the moving direction of the table 28 to the first direction at the time t10. That is, the numerical control device 4 changes signs of a change rate of the position command value (signs of the velocity command) at the time t0 and the time t10. The position command value thereby has inflection points at the time t0 and the time t10, respectively, at which points the moving direction of the table 28 is to be inverted to the opposite direction.

As shown in FIG. 3B, the motor 14 moves the table 28 to the first direction until a time t1. The motor 14 inverts the moving direction of the table. 28 from the first direction to the second direction in response to the position command changed at the time t0. At this time, a time lag (t1−t0) is generated between the time t0 at which the numerical control device 4 outputs the position command and the time t1 at which the motor 14 actually operates the table 28 in response to the position command. As shown in FIG. 3B, until the time t1, the position measurement value from the linear encoder 50 and that from the rotary encoder 60 do not completely match each other but slightly differ from each other. Similarly, at a time t12 and thereafter, the position measurement value from the linear encoder 50 and that from the rotary encoder 60 slightly differ from each other.

In a state where the backlash is present between the nuts 23 and the ball screw 25 and where the moving direction of the table 28 is to be inverted from the first direction to the second direction, the table 28 stops by as much as the backlash even if the motor 14 operates. Accordingly, during a period from the time t1 to a time t2 shown in FIG. 3B, despite a fall in a position measurement value L60 of the table 28 obtained from the rotary encoder 60, a position measurement value L50 of the table 28 obtained from the linear encoder 50 is almost constant.

Therefore, from the time t1 to the time t2, a position error between the position command value and the position measurement value L50 of the table 28 obtained from the linear encoder 50 suddenly increases, and the velocity command proportional to the position error rapidly changes accordingly. The velocity at which the motor 14 rotates (rotational velocity) is thereby increased and a gradient of the position measurement value L60 is thereby steeper than that of the position command value shown in FIG. 3A.

After the rotation of the motor 14 by as much as the backlash, the table 28 moves to the second direction according to the operation of the motor 14 from the time t2 to the time t11. At this time, as shown in FIGS. 3B and 3C, an error is generated between the position measurement values L60 and L50 by as much as the backlash.

Next, the motor 14 moves the table 28 to the second direction until the time t11. From the time t2 to the time t11, the error between the position measurement values L60 and L50 remains the same as before.

The motor 14 inverts the moving direction of the table 28 again from the second direction to the first direction in response to the position command changed at the time t10. At this time, a time lag (t11−t10) is generated between the time t10 at which the numerical control device 4 outputs the position command and the time t11 at which the motor 14 actually operates the table 28 in response to the position command.

As described above, in a state where the backlash is present and where the moving direction of the table 28 is to be inverted from the second direction to the first direction, the table 28 stops by as much as the backlash even if the motor 14 operates. Accordingly, during a period from the time t11 to the time t12 shown in FIG. 3B, despite a rise in the position measurement value L60 of the table 28 obtained from the rotary encoder 60, the position measurement value L50 of the table 28 obtained from the linear encoder 50 is almost constant. That is, the error between the position measurement values L50 and L60 from the time t2 to the time t11 decreases and returns toward zero.

From the time t11 to the time t12, the position error between the position command value and the position measurement value L50 of the table 28 obtained from the linear encoder 50 rapidly increases, and the velocity command proportional to the position error rapidly changes accordingly. The rotational velocity of the motor 14 is thereby increased and the gradient of the position measurement value L60 is thereby steeper than that of the position command value shown in FIG. 3A.

After the re-inversion of the motor 14 almost by as much as the backlash, the table 28 moves to the first direction according to the operation of the motor 14 at the time t12 and thereafter. At this time, as shown in FIGS. 3B and 3C, the error between the position measurement values L50 and L60 decreases and returns toward zero but does not often become zero. That is, even at the time t12 and thereafter, the error is often still present between the position measurement values L60 and L50.

At the time t12 and thereafter, the motor 14 similarly operates in response to the position command and operates the drive mechanism 2. At this time, when the backlash is present, the error is generated between the position measurement value L50 from the linear encoder 50 and the position measurement value L60 from the rotary encoder 60.

As shown in FIG. 3C, the lost motion amount is estimated based on the difference between the position measurement value L50 from the linear encoder 50 and the position measurement value L60 from the rotary encoder 60.

Figure 4:
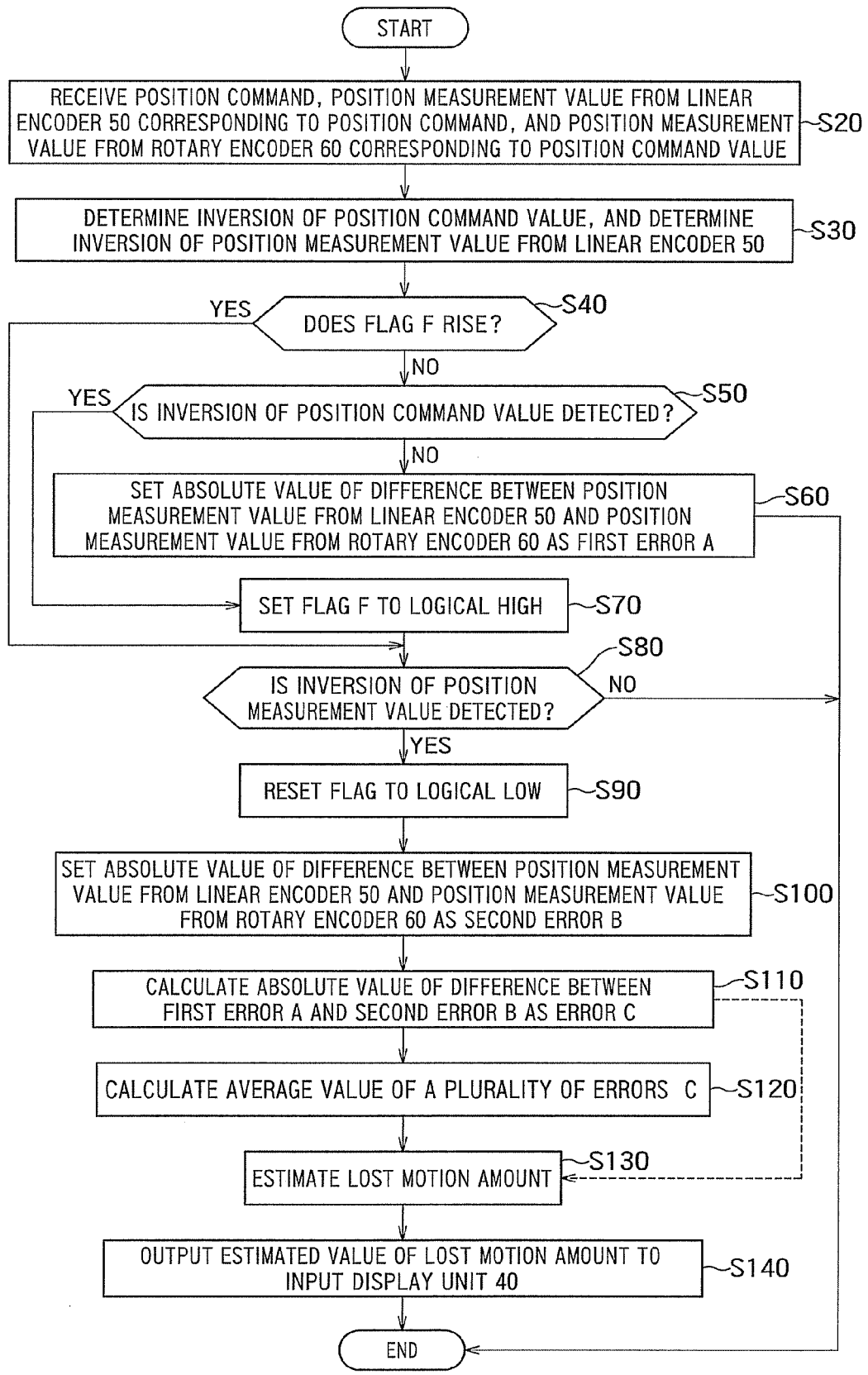
FIG. 4 is a flowchart showing a method of estimating the lost motion amount.

FIG. 4 is a flowchart showing a method of estimating the lost motion amount. The method of estimating the lost motion amount is described in more detail with reference to FIG. 4. The estimation of the lost motion amount can be performed by the lost-motion calculation unit 46.

The lost-motion calculation unit 46 repeatedly executes calculation of the change amount of the error between before and after the inversion of the moving direction of the table 28 by a regular interrupt process. For example, the lost-motion calculation unit 46 can execute the calculation of the change amount of the error between before and after the inversion of the moving direction of the table 28 for each sampling period of the numerical control device 4.

First, in an initial state, the lost-motion calculation unit 46 is assumed to receive, from the servo control unit 12, a plurality of position command values output in a plurality of successive sampling periods, position measurement values obtained from detection results of the linear encoder 50 corresponding to the respective position commands, and position measurement values obtained from detection results of the rotary encoder 60 corresponding to the respective position commands. The lost-motion calculation unit 46 can directly receive the position command values from the trajectory generation unit 44.

The lost-motion calculation unit 46 receives the position command value output in a next sampling period, the position measurement value from the linear encoder 50 corresponding to the position command, and the position measurement value from the rotary encoder 60 from the servo control unit 12 (S20).

Next, the lost-motion calculation unit 46 determines whether the position command value indicates the inversion of the moving direction of the table 28 based on the position command values obtained in the successive sampling periods (S30). For example, the lost-motion calculation unit 46 can determine whether the position command value indicates the inversion of the moving direction of the table 28 based on the change of the signs of the change rate of the position command value (signs of the velocity command) as described with reference to FIG. 3A. When the position command value does not change (the change rate of the position command value is zero), the lost-motion calculation unit 46 maintains the moving direction at that time as it is.

The lost-motion calculation unit 46 also determines whether the moving direction of the table 28 is actually inverted based on the position measurement values from the linear encoder 50 in the successive sampling periods (S30). For example, the lost-motion calculation unit 46 can determine the moving direction of the table 28 based on the change of the signs of the change rate of the position measurement value (signs of the velocity) from the linear encoder 50. When this change rate of the position measurement value does not change (the change rate of the position measurement value is zero), the lost-motion calculation unit 46 maintains the moving direction at that time as it is. In this case, an appropriate dead zone can be set to prevent the moving direction from being erroneously detected due to a fluctuation when counting the linear encoder 50. In this way, the lost-motion calculation unit 46 determines whether the position command value indicates the inversion of the moving direction of the table 28 (hereinafter, also "inversion of position command value") and whether the position measurement value from the linear encoder 50 indicates the inversion of the moving direction of the table 28 (hereinafter, also "inversion of position measurement value") at Step S30.

The lost-motion calculation unit 46 refers to a flag F (S40). The flag F rises when the flag F indicates the inversion of the position command value. In a case of the initial state or in a case where the inversion of the position command value is not detected, the flag F falls to logical low (0), for example. On the other hand, when the inversion of the position command value is detected at Step S60 described later, the flag F rises to logical high (1), for example. As long as the flag F can indicate the inversion of the position command, logical states of the flag F can be exchanged. It suffices to store the flag F in a register (not shown) within the memory 41 or the lost-motion calculation unit 46.

When the flag F falls (NO at S40), the lost-motion calculation unit 46 refers to the state of the inversion of the position command value determined at Step S30 (S50).

When the inversion of the position command value is not detected (NO at S50), the lost-motion calculation unit 46 sets an absolute value of the difference between the position measurement value from the linear encoder 50 and that from the rotary encoder 60 as a first error A (S60). That is, the lost-motion calculation unit 46 calculates the difference between the position measurement value from the linear encoder 50 and that from the rotary encoder 60 before inverting the moving direction of the table 28 (before the time t0 shown in FIG. 3A, for example) as the first error A of the drive mechanism 2. It suffices to store (set) the first error A in the register within the memory 41 or the lost-motion calculation unit 46. The servo control unit 12 can calculate the first error A and transmit the first error A to the lost-motion calculation unit 46. In this case, the lost-motion calculation unit 46 suffices to receive the first error A and does not need to calculate the first error A.

In a period in which the inversion of the position command value is not detected (before the time t0 shown in FIG. 3A, for example), the numerical control device 4 repeatedly performs Steps S20 to S60 described above for each regular interrupt process. In this case, the first error A is stored in the register within the memory 41 or the lost-motion calculation unit 46 whenever the numerical control device 4 performs Steps S20 to S60. Alternatively, the first error A obtained whenever the numerical control device 4 performs Steps S20 to S60 can be averaged.

When the inversion of the position command value is detected (YES at S50) at Step S50 for a certain interrupt process, the lost-motion calculation unit 46 raises (sets) the flag F to logical high (1), for example (S70).

Next, the lost-motion calculation unit 46 refers to the state of the inversion of the position measurement value determined at Step S30 (S80). When the inversion of the position measurement value is not detected (NO at S80), the numerical control device 4 repeatedly performs Steps S20 to S80 described above for each interrupt process. A state at this time is a state where the inversion of the position command value is detected and where the inversion of the position measurement value is not detected. For example, such a period in which the inversion of the position command value is detected and in which the inversion of the position measurement value is not detected is the period from the time t0 to the time t2 shown in FIG. 3B (a period of the time lag in which the influence of the backlash appears).

When the inversion of the position measurement value is detected (YES at S80) at Step S80 for a certain interrupt process, the lost-motion calculation unit 46 lowers the flag F to the logical low and resets the flag F (S90). In this way, the flag F is provided to detect the period (the time lag) from the time when the position command indicates the inversion of the moving direction of the table 28 to the time when the moving direction of the table 28 is actually inverted.

The lost-motion calculation unit 46 sets the absolute value of the difference between the position measurement value from the linear encoder 50 and that from the rotary encoder 60 as a second error B (S100). That is, the lost-motion calculation unit 46 calculates the difference between the position measurement value from the linear encoder 50 and that from the rotary encoder 60 after inverting the moving direction of the table 28 (from the time t2 to the time t10 shown in FIGS. 3A to 3C, for example) as the second error B of the drive mechanism 2. It suffices to store (set) the second error B in the register within the memory 41 or the lost-motion calculation unit 46. The servo control unit 12 can calculate the second error B and transmit the second error B to the lost-motion calculation unit 46. In this case, the lost-motion calculation unit 46 suffices to receive the second error B and does not need to calculate the second error B.

Next, the lost-motion calculation unit 46 calculates an absolute value of a difference between the first error A and the second error B as an error C (S110). The error C is stored in the register within the memory 41 or the lost-motion calculation unit 46 whenever the numerical control device 4 performs steps S20 to S60. As indicated by a broken line of FIG. 4, the lost-motion calculation unit 46 can estimate the error C as the transmission error (the lost motion amount) of the drive mechanism 2 (S130). Alternatively, the lost-motion calculation unit 46 can calculate an average value of a plurality of errors C, that is, a currently calculated error C and previously calculated errors C (S120) and estimate the average value as the transmission error (the lost motion amount) of the drive mechanism 2 (S130).

The lost-motion calculation unit 46 outputs the estimated value of the lost motion amount to the input display unit 40 (S140). The input display unit 40 displays the estimated value of the lost motion amount. A user can thereby grasp a change of the lost motion amount. Therefore, before degradation in a quality of the machining target, the user can make a preparation of components necessary for a repair or the like and thereby maintenance the machine tool promptly. Therefore, it is unnecessary to stop the machine tool for a long period of time for the repair.

The alarm unit 48 issues an alarm when the estimated value of the lost motion amount exceeds the predetermined value. The machine tool can thereby call the user's attention for the maintenance of the machine tool when the lost motion amount increases. It suffices to store the predetermined value in the register within the memory 41 or the lost-motion calculation unit 46.

Furthermore, the input display unit 40 or the alarm unit 48 can notify the user of a maintenance timing of the drive mechanism 2 based on a plurality of estimated values of the lost motion amount. In this case, it suffices to store the estimated values in the memory 41. For example, if not only the single estimated value but also a plurality of estimated values exceed the predetermined value, the input display unit 40 or the alarm unit 48 notifies the user of the maintenance timing of the drive mechanism 2. With this configuration, the input display unit 40 or the alarm unit 48 does not notify the user of the maintenance timing of the drive mechanism 2 even if an erroneous estimated value specifically exceeds the predetermined value. The machine tool can thereby accurately inform the user of the maintenance timing of the machine tool. The input display unit 40 or the alarm unit 48 can notify the user of the maintenance timing of the drive mechanism 2 when a plurality of continuously calculated estimated values exceed the predetermined value. Alternatively, the input display unit 40 or the alarm unit 48 can notify the user of the maintenance timing of the drive mechanism 2 when a plurality of discretely calculated estimated values exceed the predetermined value.

Moreover, the user can predict and manage the maintenance timing of the machine tool by storing a plurality of previous estimated values in a database (not shown) inside or outside of the machine tool and presenting the previous estimated values to the user in the form of a graph.

Furthermore, the machine tool according to the present embodiment does not simply set the difference between the position measurement value from the linear encoder 50 and that from the rotary encoder 60 (either the first error A or the second error B, for example) as the lost motion amount. The machine tool according to the present embodiment estimates the lost motion amount based on the change amount of the errors between before and after the inversion of the moving direction of the table 28 (the error C, for example). Therefore, as shown in FIGS. 3B and 3C, for example, even if errors are present both before and after the inversion of the moving direction of the table 28, the machine tool according to the present embodiment can estimate an accurate lost motion amount.

The invention claimed is:

1. A machine tool comprising:
   a drive mechanism configured to move a control target;
   a motor configured to operate the drive mechanism;
   a first encoder configured to detect a position of the control target;
   a second encoder configured to detect a position of the motor;
   a servo control unit configured to control the motor; and
   a numerical control unit configured to receive or calculate an error between the position of the control target obtained from a detection result of the first encoder and a position of the control target obtained from a detection result of the second encoder from the servo control unit, and to estimate a transmission error of the drive mechanism based on a change amount of the error between before and after inversion of a moving direction of the control target, wherein the numerical control unit is configured to:
   receive or calculate a first error of the drive mechanism from the servo control unit, the first error being based on the position of the control target obtained from the detection result of the first encoder and the position of the control target obtained from the detection result of the second encoder before the inversion of the moving direction of the control target,
   receive or calculate a second error of the drive mechanism from the servo control unit, the second error being based on the position of the control target obtained from the detection result of the first encoder and the position of the control target obtained from the detection result of the second encoder after the inversion of the moving direction of the control target, and
   estimate a difference between the first error and the second error as the transmission error of the drive mechanism, or calculate a difference between the first error and the second error a plurality of times to obtain a plurality of differences and estimate an average value of the differences as the transmission error of the drive mechanism.

2. The machine tool of claim 1, further comprising a storage unit configured to store therein a flag, the flag rising when a position command output from the numerical control unit to the servo control unit indicates the inversion of the moving direction of the control target.

3. The machine tool of claim 2, wherein the numerical control unit sets the first error when the flag falls and sets the second error after the flag rises in order to calculate a difference between the first error and the second error.

4. The machine tool of claim 2, wherein the flag falls when the moving direction of the control target is actually inverted after the position command indicates the inversion of the moving direction of the control target.

5. The machine tool of claim 2, further comprising a display unit configured to display an estimated value of the transmission error of the drive mechanism.

6. The machine tool of claim 5, wherein
   the storage unit stores therein a plurality of estimated values of the transmission error of the drive mechanism, and
   the display unit or the alarm unit notifies a user of a maintenance timing of the drive mechanism based on the estimated values.

7. The machine tool of claim 1, further comprising an alarm unit configured to issue an alarm when an estimated value of the transmission error of the drive mechanism exceeds a predetermined value.

8. A control method for a machine tool comprising: a drive mechanism configured to move a control target; a motor configured to operate the drive mechanism; a first encoder configured to detect a position of the control target; a second encoder configured to detect a position of the motor; a servo control unit configured to control the motor; and a numerical control unit configured to output a position command to the servo control unit, the method comprising:
   receiving or calculating an error between the position of the control target obtained from a detection result of the first encoder and a position of the control target obtained from a detection result of the second encoder;
   calculating a change amount of the error between before and after inversion of a moving direction of the control target; and
   estimating a transmission error of the drive mechanism based on the change amount of the error, wherein the receiving or calculating the error comprises:
   receiving or calculating a first error of the drive mechanism based on the position of the control target obtained from the detection result of the first encoder and the position of the control target obtained from the detection result of the second encoder before the inversion of the moving direction of the control target; and
   receiving or calculating a second error of the drive mechanism based on the position of the control target obtained from the detection result of the first encoder and the position of the control target obtained from the detection result of the second encoder after the inversion of the moving direction of the control target, and
   a difference between the first error and the second error is estimated as the transmission error of the drive mechanism or repeatedly receiving or calculating the error, calculating a difference between the first error and the second error a plurality of times to obtain a plurality of differences, and estimating an average value of the differences as the transmission error of the drive mechanism.

9. The method of claim 8, wherein the first error is set when a flag falls and the second error is set after the flag rises in order to calculate the difference between the first error and the second error, the flag rising when a position command output from the numerical control unit to the servo control unit indicates the inversion of the moving direction of the control target.

10. The method of claim 9, wherein the flag falls when the moving direction of the control target is actually inverted after the position command indicates the inversion of the moving direction of the control target.

11. The method of claim 8, wherein the machine tool configured to issue an alarm when an estimated value of the transmission error of the drive mechanism exceeds a predetermined value.

12. The method of claim 8, wherein the machine tool notifies a user of a maintenance timing of the drive mechanism based on the estimated values.

* * * * *